(12) United States Patent
Chen (10) Patent No.: US 9,261,711 B1
(45) Date of Patent: Feb. 16, 2016

(54) EYEGLASSES WITH REPLACEABLE LENSES

(71) Applicant: HWA MEEI OPTICAL CO., LTD., Tainan (TW)

(72) Inventor: Chih-Ming Chen, Tainan (TW)

(73) Assignee: Hwa Meei Optical Co., Ltd., Tainan (TW)

(*) Notice: Subject to any disclaimer, the term of this patent is extended or adjusted under 35 U.S.C. 154(b) by 0 days.

(21) Appl. No.: 14/578,348

(22) Filed: Dec. 20, 2014

(51) Int. Cl.
*G02C 1/04* (2006.01)
*G02C 1/00* (2006.01)

(52) U.S. Cl.
CPC .. *G02C 1/10* (2013.01); *G02C 1/04* (2013.01); *G02C 2200/06* (2013.01); *G02C 2200/08* (2013.01)

(58) Field of Classification Search
CPC ........ G02C 1/04; G02C 1/10; G02C 2200/06; G02C 2200/08
USPC .................................. 351/103–109, 140, 154
See application file for complete search history.

(56) References Cited

U.S. PATENT DOCUMENTS

2014/0160422 A1* 6/2014 Chen ........................ G02C 1/04
351/105

* cited by examiner

*Primary Examiner* — Huy K Mai
(74) *Attorney, Agent, or Firm* — Alan D. Kamrath; Kamrath IP Lawfirm, P.A.

(57) ABSTRACT

A pair of eyeglasses includes a glasses frame, at least one lens detachably installed to the glasses frame, two temples, and two push-on fasteners. A connecting portion is formed on each end of the glasses frame and includes a slot. The lens has a notch matching a portion of the slot of the connecting portion. Each temple is pivotally fitted to the glasses frame and rotatable relative to the glasses frame between an unfolded position and a folded position. Each push-on fastener can be moved between first and second positions when the temple is in the folded position. Each push-on fastener has a positioning portion extending through the slot of the connecting portion. The positioning portion in the first position is engaged in the notch to fix the lens. The positioning portion in the second position is separated from the notch and allows the lens to be replaced.

5 Claims, 7 Drawing Sheets

EYEGLASSES WITH REPLACEABLE LENSES

BACKGROUND OF THE INVENTION

1. Field of the Invention

The present invention relates to a pair of eyeglasses with lens replaceable conveniently and, more particularly, to a structure on a pair of glasses for fastening of lenses.

2. Description of the Related Art

In the era of material life promoted, people with novelty aspiration are fastidious about portable decorative objects. For example, sunglasses or leisure eyeglasses are popularized among persons who value the eyeglasses aesthetically matching costumes. In this regard, a user who prefers versatile fancy sunglasses or leisure eyeglasses may change lenses in a pair of eyeglasses frequently to match his/her mood or costumes but finally buy a new pair of eyeglasses without cost effectiveness because lenses of the eyeglasses are difficultly replaced.

Specifically, a pair of eyeglasses conventionally includes a glasses frame, two lenses, and two temples pivotally fitted to both sides of the glasses frame. Two bezels are prepared around inner edges of the glasses frame and used to join the two lenses. In general, the lenses to be assembled should be forcibly embedded into the bezels according to elasticity of the glasses frame. However, the fragile lenses or the glasses frame may be damaged in the course of assembling the lenses.

There have been multiple conventional techniques for a pair of eyeglasses which feature lenses replaceable conveniently and neither lenses nor a glasses frame damaged. However, the conventional eyeglasses with lenses replaceable conveniently generally have a complex structure and negative effects on appearance of the pair of eyeglasses.

BRIEF SUMMARY OF THE INVENTION

Thus, an objective of the present invention is to provide a pair of eyeglasses which is characteristic of lenses conveniently and quickly replaced by a user and a simplified structure for fastening of lenses.

To achieve this and other objectives, a pair of eyeglasses of the present invention includes a glasses frame, at least one lens, two temples, and two push-on fasteners. The glasses frame includes first and second ends spaced in a longitudinal direction and at least one lens support slot between the first and second ends. Each of the first and second ends of the glasses frame includes a connecting portion, and each connecting portion includes internal and external ends spaced in the longitudinal direction. The support slot extends to the internal ends of the connecting portions. Each connecting portion further includes an outer surface, an inner surface, and a slot extending through the inner surface from the outer surface. A guide groove is designed in the outer surface of each of the connecting portions and extends in the longitudinal direction. The lens is detachably installed in the lens support slots of the glasses frame and includes a lateral portion having a notch matching a portion of the slot of one of the connecting portions. Each temple includes a front end pivotally connected with the glasses frame, so that each temple is rotatable relative to the glasses frame between an unfolded position and a folded position. Each push-on fastener includes a fastener body held in the guide groove of a corresponding connecting portion. Each push-on fastener further includes a positioning portion protruding from an inner side of the fastener body and penetrates the slot of the corresponding connecting portion. Each push-on fastener is movable between a first position and a second position. The positioning portion of the push-on fastener cannot be moved to the second position from the first position when the temple is in the unfolded position, and the positioning portion of the push-on fastener can be moved between the first position and the second position when the temple is in the folded position. The positioning portion of the push-on fastener is engaged in the notch of the corresponding lens when each of the two push-on fasteners is in the first position, and the positioning portion of the push-on fastener is separated from the notch of the corresponding lens and allows the lens to be conveniently replaced when the push-on fastener is in the second position.

In a preferred form, the fastener body includes an inside end and an outside end. The outside end of the fastener body does not protrude from the external end of the connecting portion when the push-on fastener is in the first position, and the outside end of the fastener body protrudes from the external end of the connecting portion when the push-on fastener is in the second position. The outside end of the fastener body is resisted by the front end of the temple when the temple is in the unfolded position and the push-on fastener is in the first position.

In a preferred form, a dilated head is formed at a distal end of the positioning portion and is slightly greater than the slot in size.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

A pair of eyeglasses 10 according to the preferred teachings of the present invention is shown in FIGS. 1 through 7 of the drawings and includes a glasses frame 12, at least one lens 14, two temples (first and second temples) 16, and two push-on fasteners (first and second push-on fasteners) 18. The eyeglasses 10 may be a pair of sunglasses, leisure eyeglasses, sports eyeglasses, protective goggles, nearsighted eyeglasses, farsighted spectacles, presbyopic glasses, etc. The glasses frame 12 is made of materials including, without limitation, metal, alloy, or plastic. The temples 16 and the push-on fasteners 18 can be made of plastic, rubber or metal. The temples 16 can be in the form of straps. The push-on fasteners 18 which are respectively identical to each other in structure are explained according to one of the push-on fasteners 18.

The glasses frame 12 includes first and second ends 20 and 22 spaced in a longitudinal direction. A middle section 24 is defined between the first and second ends 20 and 22, and a nose pad 26 is provided under the middle section 24. Each of the first and second ends 20 and 22 of the glasses frame 12 includes a connecting portion 28. In this embodiment, the connecting portions 28 are formed on bottoms of the first and second ends 20 and 22, respectively. Each of the connecting portions 28 includes an internal end 30 facing the nose pad 26 and an external end 32 spaced from the internal end 30 in the longitudinal, direction. In the embodiment, the pair of eyeglasses 10 includes two lenses 14, and the glasses frame 12 further includes two lens support slots 34 in which the two lenses 14 are installed. Each of the lens support slots 34 along an undersurface of the glasses frame 12 extends to the internal end 30 of one of the connecting portions 28 from one side of the nose pad 26. A raised engaging lug 36 is formed on the external end 32 of each of the connecting portions 28 and includes a pivotal hole 38 therein. Each of the connecting portions 28 further includes an outer surface 40 and an inner surface 42 which is opposite to a glasses user's face on which the pair of eyeglasses 10 is worn. A guide groove 44 extending in the longitudinal direction is designed in the outer surface 40 of each connecting portion 28 and is communication with the lens support slot 34 in the internal end 30 of the connecting portion 28. Each of the connecting portions 28 further includes a slot 46 extending through the inner surface 42 from the outer surface 40. A recess 47 is designed in the inner surface 42 and between the internal end 30 and the slot 46 of each connecting portion 28 in the longitudinal direction (see FIG. 6).

Each of the lenses 14 includes an upper portion 48 and two lateral portions 50 which are embedded into one of the lens support slots 34 of the glasses frame 12. Moreover, each of the lenses 14 has a notch 52 formed in one lateral portion 50 corresponding the internal end 30 of an associated connecting portion 28. The notch 52 of one of the lenses 14 matches a portion of the slot 46 of the associated connecting portion 28 when the lens 14 is embedded into one lens support slot 34 of the glasses frame 12 (see FIG. 5).

Each of the temples 16 includes front and rear ends 54 and 56 spaced in a length direction thereof. The front end 54 of each temple 16 is pivotally connected with the glasses frame 12, and the rear end 56 of each temple 16 is adapted to be worn on a user's ear. An indentation 58 is designed in the front end 54 of each of the temples 16 for receiving a corresponding engaging lug 36 of the glasses frame 12. When both the indentation 58 and the engaging lug 36 are penetrated by a shaft 60, the temple 16 is coupled with the glasses frame 12 and rotatable relative to the glasses frame 12 between an unfolded position and a folded position about an axis defined by the shaft 60. Furthermore, a concave end face 61 is formed at the front end 54 of each of the temples 16.

Each of the push-on fasteners 18 is used to link the glasses frame 12 and a corresponding lens 14. Each of push-on fasteners 18 includes an elongate fastener body 62 and a positioning portion 64 protruding from an inner side of the fastener body 62. The fastener body 62 is held in the guide groove 44 of one corresponding connecting portion 28, and the positioning portion 64 penetrates the slot 46 of the corresponding connecting portion 28 and has a width less than that of the slot 46 in the longitudinal direction. Thus, each of the push-on fasteners 18 can be moved between a first position and a second position and limited in the longitudinal direction due to the longitudinal dimension of the slot 46. The fastener body 62 includes an inside end 66 and an outside end 68. The positioning portion 64 of the push-on fastener 18 is engaged in the notch 52 of the corresponding lens 14 and the outside end 68 of the fastener body 62 does not protrude from the external end 32 of the connecting portion 28 when the push-on fastener 18 is in the first position (the inside end 66 of the fastener body 62 matches the internal end 30 of the connecting portion 28). The positioning portion 64 of the push-on fastener 18 is separated from the notch 52 of the corresponding lens 14 and the outside end 68 of the fastener body 62 protrudes from the external end 32 of the connecting portion 28 when the push-on fastener 18 is in the second position. A dilated head 70 is formed at a distal end of the positioning portion 64 and is slightly greater than the slot 46 in size (the dilated head 70 can be formed after the positioning portion 64 penetrates the slot 46), so that the push-on fastener 18 is not separated from the slot 46. Moreover, the head 70 is provided with a protrusion 72 which is coupled with one corresponding recess 47 of the glasses frame 12 when the push-on fastener 18 is shifted to the first position at which the push-on fastener 18 is positioned. In a feasible embodiment, the protrusion 72 and the recess 47 can be interchanged in design so that the protrusion 72 and the recess 47 are located at the glasses frame 12 and the push-on fastener 18, respectively.

Figure 1:
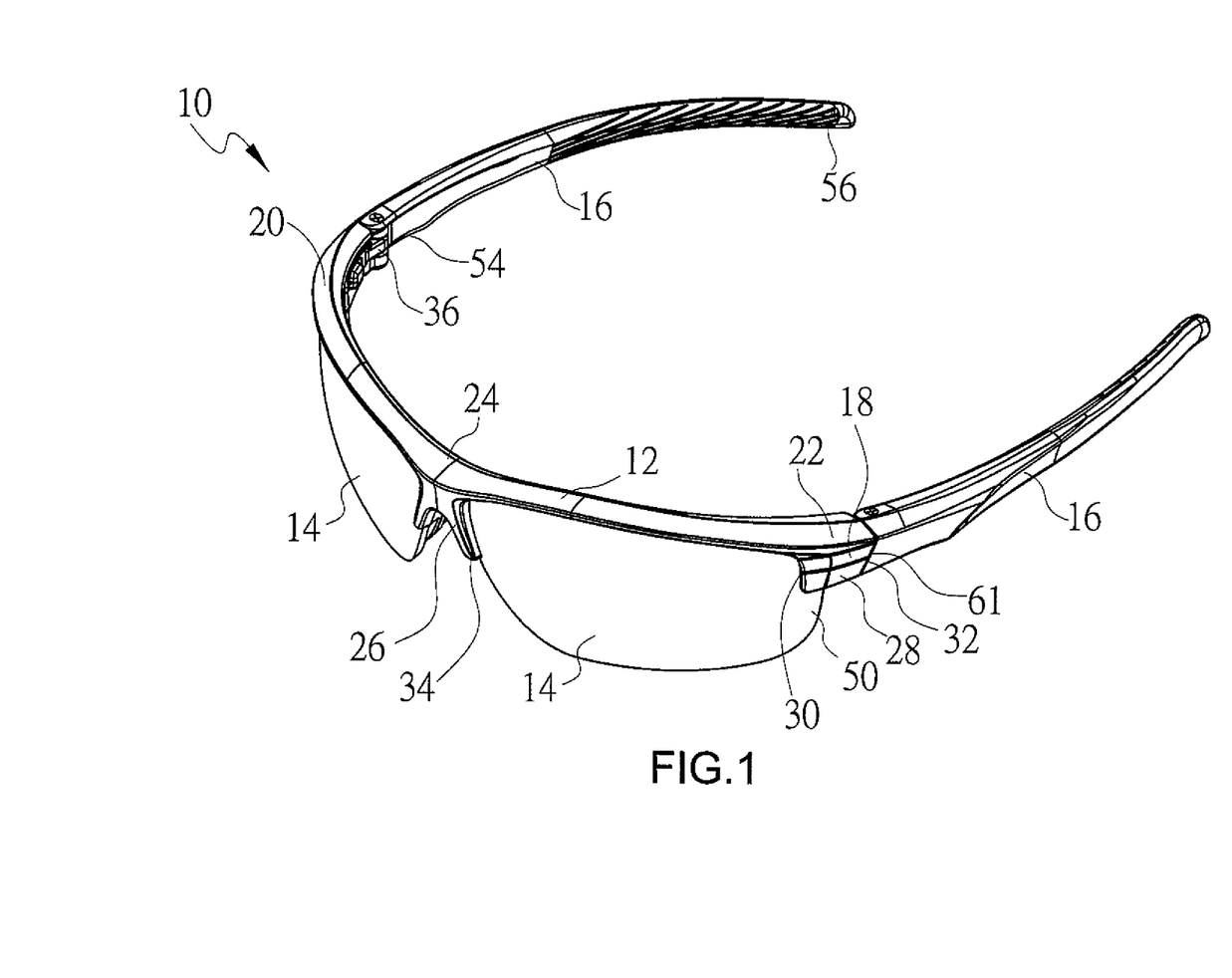
FIG. 1 is a perspective view of a pair of eyeglasses in accordance with an embodiment of the present invention.
Figure 2:
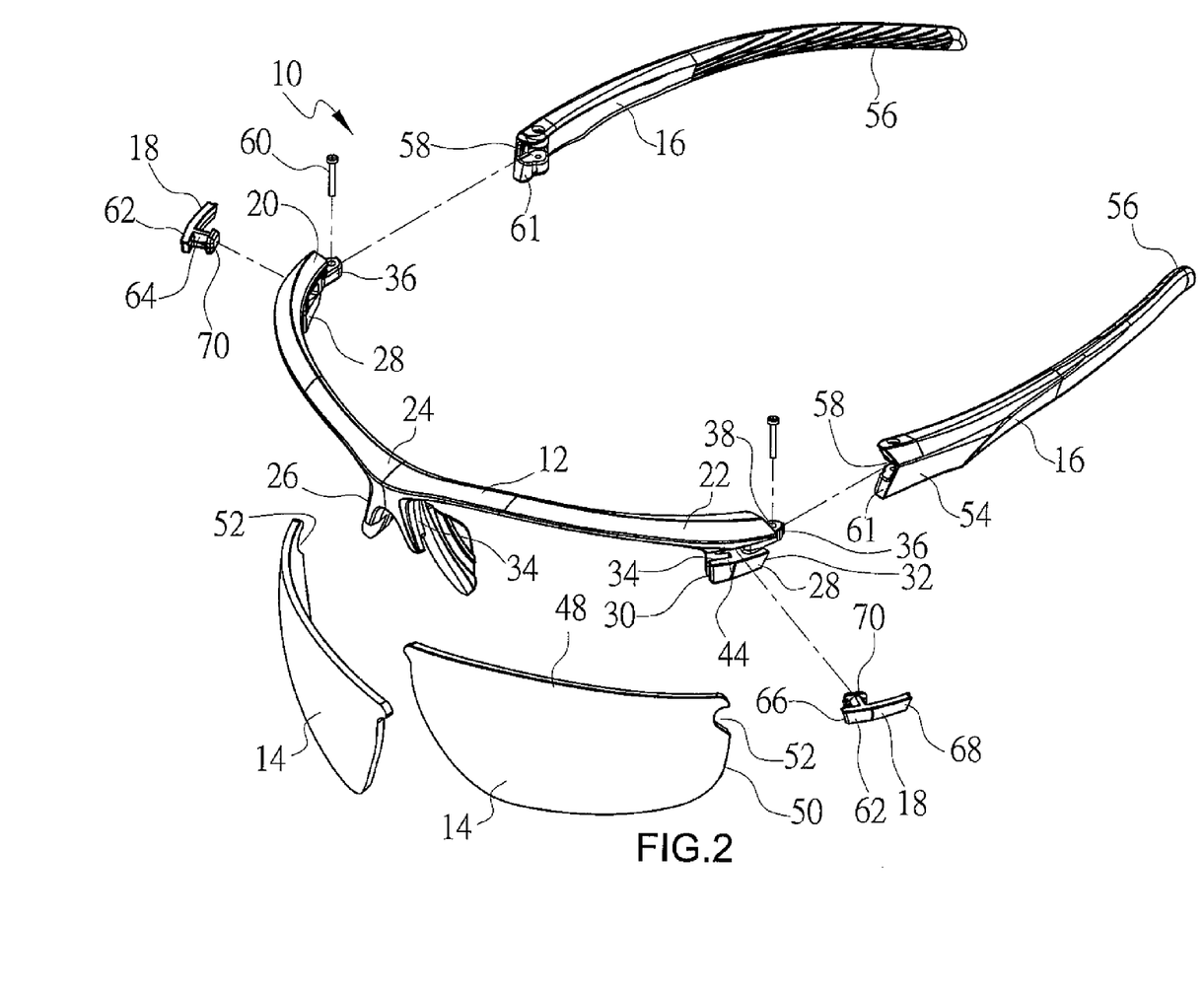
FIG. 2 shows an exploded view of the pair of eyeglasses of FIG. 1.
Figure 3:
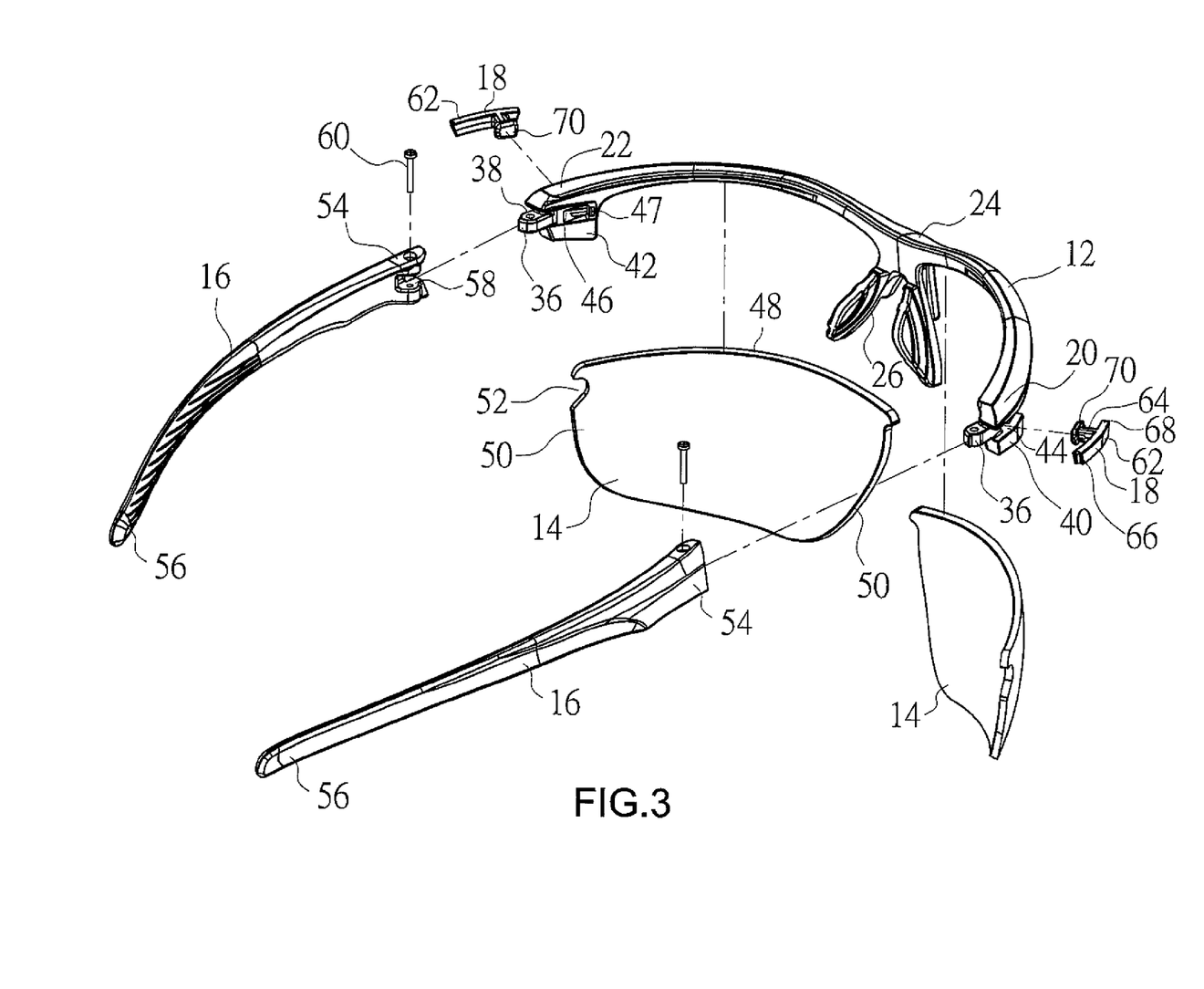
FIG. 3 shows another exploded view of the pair of eyeglasses of FIG. 1.
Figure 4:
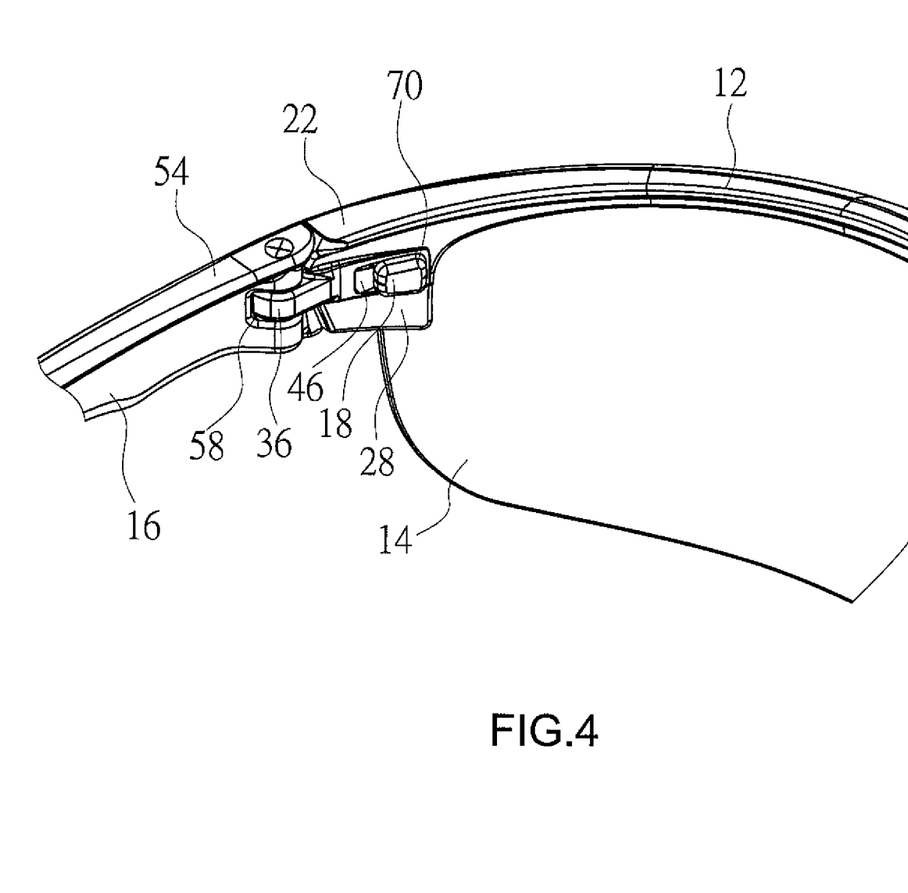
FIG. 4 is a partial, enlarged view of the pair of eyeglasses of FIG. 1.
Figure 5:
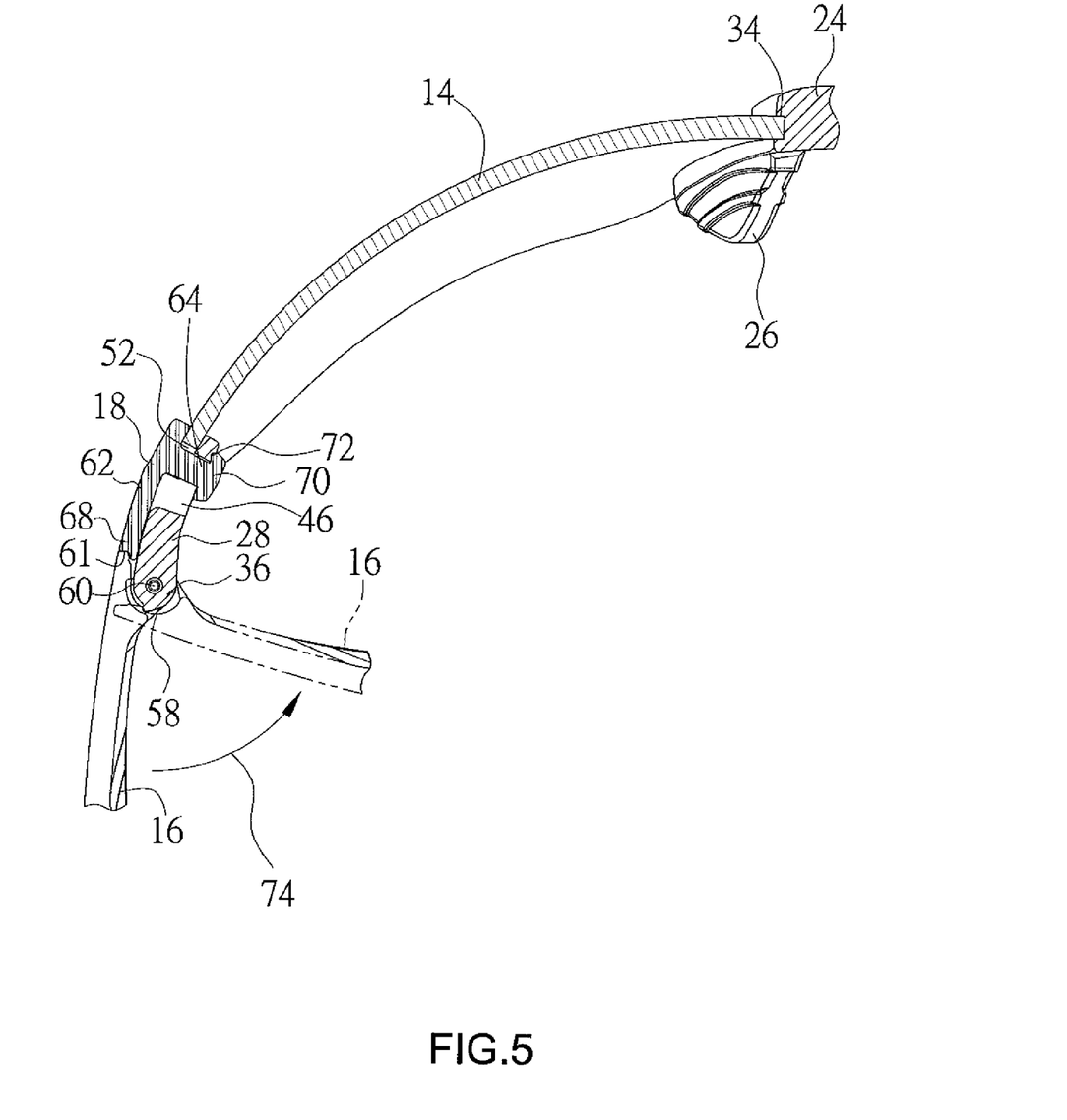
FIG. 5 is a partial, sectional view of the pair of eyeglasses of FIG. 1, with a temple of the pair of eyeglasses opened.
Figure 6:
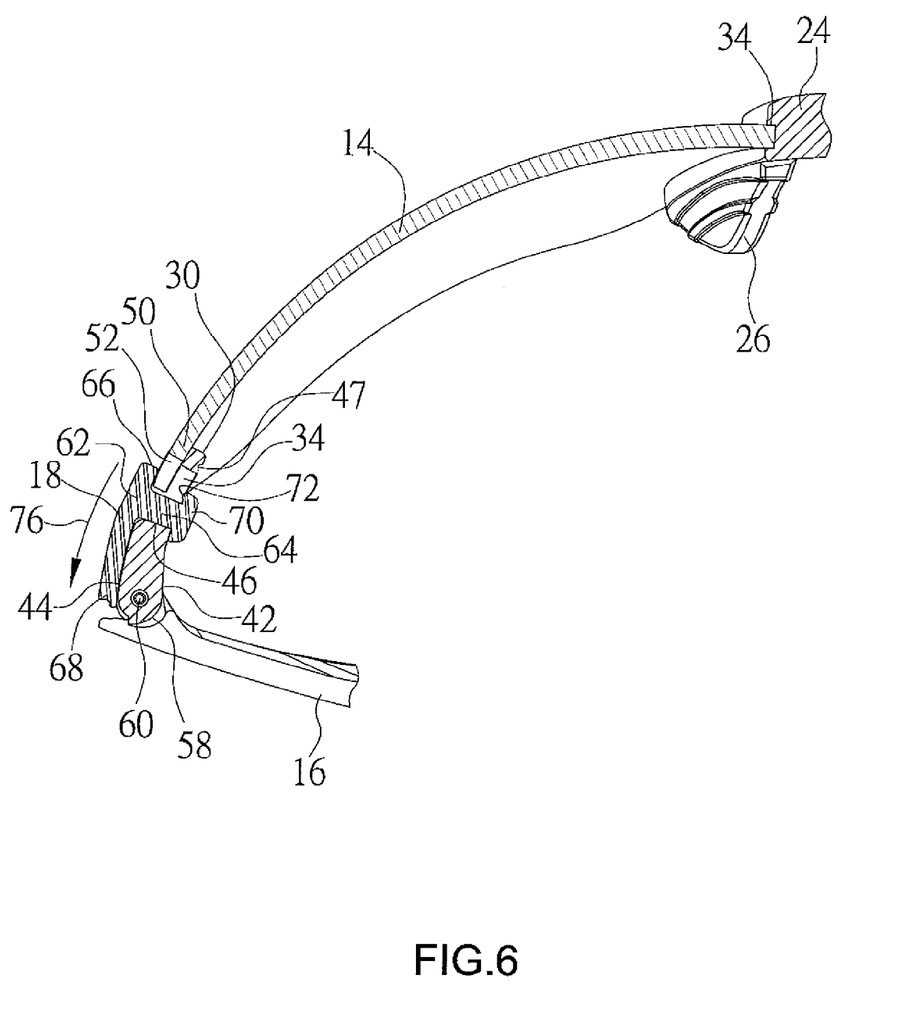
FIG. 6 is a sectional view similar to FIG. 5, with the temple folded and with a push-on fastener moved from a first position to a second position.
Figure 7:
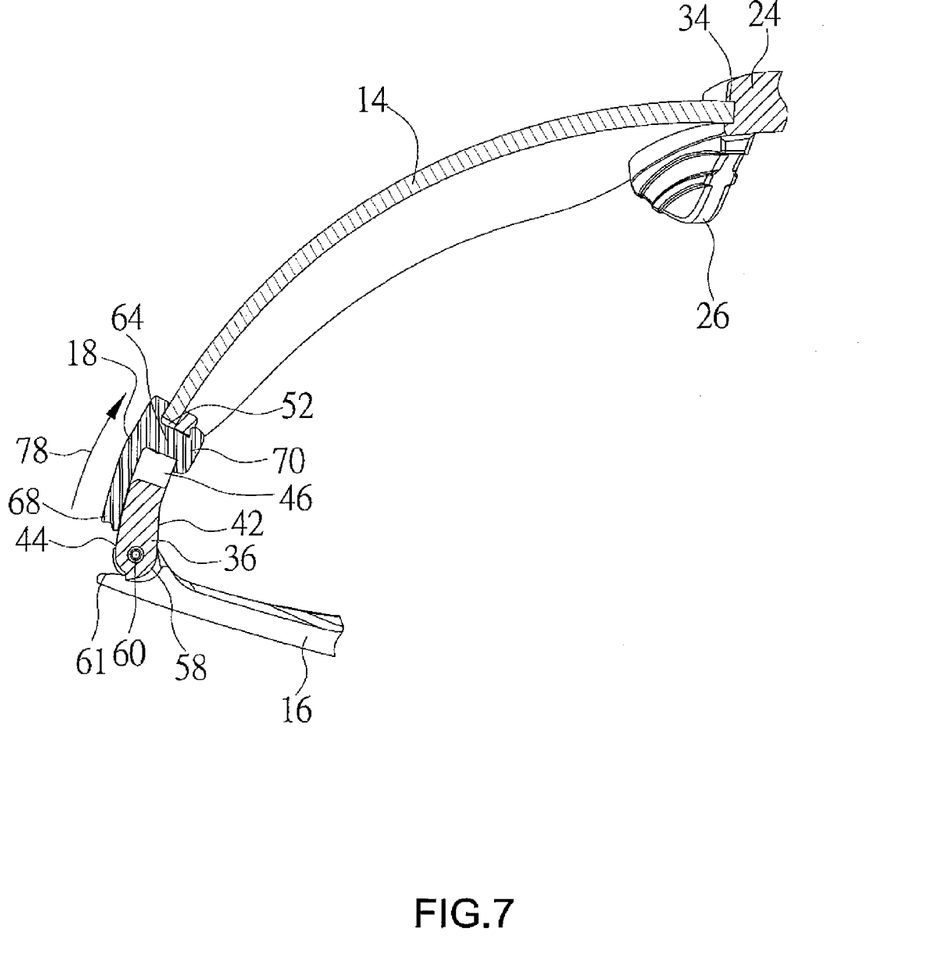
FIG. 7 is a sectional view similar to FIG. 6, with the push-on fastener moved from the second position to the first position for fixing the lens.

FIGS. 4 and 5 illustrate the temple 16 is in the unfolded position, and the push-on fastener 18 is in the first position. The end face 61 of the front end 54 of the temple 16 resists the outside end 68 of the fastener body 62 when the push-on fastener 18 is shifted to the first position. Furthermore, the protrusion 72 of the push-on fastener 18 is coupled with a corresponding recess 47 in the glasses frame 12, allowing the push-on fastener 18 to be positioned in the first position. Thus, the lens 14 is fixed in the glasses frame 12 with the positioning portion 64 of the push-on fastener 18 engaged in the notch 52 of the lens 14.

According to the eyeglasses 10 of the present disclosure, the lenses 14 can be conveniently replaced from the eyeglasses 10. Specifically, the temple 16 should be shifted to the folded position from the unfolded position (see arrow 74 in FIG. 5) by a user who intends to replace one of the lenses 14. Next, as shown in arrow 76 in FIG. 6, the push-on fastener 18 should be shifted to the second position in FIG. 6 from the first position in FIG. 5 (the outside end 68 of the fastener body 62 is not held up by the front end 54 of the temple 16 which is in the folded position), so that the positioning portion 64 of the push-on fastener 18 is separated from the notch 52 of the lens 14. As such, the lens 14 to be replaced can be removed from the glasses frame 12. On the other hand, the lens 14 to be assembled to the glasses frame 12 should be embedded into the lens support slot 34 of the glasses frame 12. Next, the push-on fastener 18 should be shifted to the first position in FIG. 7 from the second position in FIG. 6 (see arrow 78 in FIG. 7). As such, the lens 14 is fixed with the positioning portion 64 of the push-op fastener 18 engaged in the notch 52 of the lens 14.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A pair of eyeglasses with replaceable lenses, comprising:
   a glasses frame including first and second ends spaced in a longitudinal direction, with the glasses frame further including at least one lens support slot between the first and second ends, with each of the first and second ends of the glasses frame including a connecting portion, with each of the two connecting portions including internal and external ends spaced in the longitudinal direction, with the at least one lens support slot extending to the internal ends of the two connecting portions, with each of the two connecting portions further including an outer surface, an inner surface, and a slot extending through the inner surface from the outer surface, with a guide groove designed in the outer surface of each of the two connecting portions and extending in the longitudinal direction;

at least one lens detachably installed in the lens support slots of the glasses frame and including a lateral portion having a notch matching a portion of the slot of one of the two connecting portions;

two temples each including a front end pivotally connected with the glasses frame, with each of the two temples rotatable relative to the glasses frame between an unfolded position and a folded position; and two push-on fasteners each including a fastener body held in the guide groove of a corresponding connecting portion, with each of the two push-on fasteners further including a positioning portion penetrating the slot of the corresponding connecting portion, with each of the two push-on fasteners movable between a first position and a second position when the temple is in the folded position, with the positioning portion engaged in the notch of the corresponding lens when each of the two push-on fasteners is in the first position, with the positioning portion separated from the notch of the corresponding lens when the push-on fastener is in the second position.

2. The eyeglasses with replaceable lenses according to claim 1, wherein the fastener body includes an inside end and an outside end, wherein the outside end of the fastener body does not protrude from the external end of a corresponding connecting portion when the push-on fastener is in the first position, and the outside end of the fastener body protrudes from the external end of the corresponding connecting portion when the push-on fastener is in the second position, wherein the positioning portion of the push-on fastener cannot be moved to the second position from the first position when the temple is in the unfolded position, with the outside end of the fastener body resisted by the front end of the temple when the temple is in the unfolded position and the push-on fastener is in the first position.

3. The eyeglasses with replaceable lenses according to claim 2, wherein a raised engaging lug is formed on the external end of each of the two connecting portions and includes a pivotal hole, with an indentation designed in the front end of each of the two temples for receiving a corresponding engaging lug of the glasses frame, with a shaft extending through both the indentation and the engaging lug, with a concave end face formed at the front end of each of the two temples.

4. The eyeglasses with replaceable lenses according to claim 1, wherein a dilated head is formed at a distal end of the positioning portion and is slightly greater than the slot in size.

5. The eyeglasses with replaceable lenses according to claim 4, wherein a recess is designed in the inner surface and between the internal end and the slot of each of the two connecting portions in the longitudinal direction, with the dilated head provided with a protrusion which is coupled with one corresponding recess of the glasses frame when the push-on fastener is in the first position.

\* \* \* \* \*